United States Patent
Saitoh

(10) Patent No.: US 8,310,635 B2
(45) Date of Patent: Nov. 13, 2012

(54) ELECTRO-OPTIC DEVICE, ELECTRONIC INSTRUMENT, AND PROJECTION DISPLAY

(75) Inventor: Hiromi Saitoh, Chino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/025,790

(22) Filed: Feb. 11, 2011

(65) Prior Publication Data

US 2011/0128479 A1 Jun. 2, 2011

Related U.S. Application Data

(63) Continuation of application No. 12/149,983, filed on May 12, 2008, now Pat. No. 7,911,571, which is a continuation of application No. 11/717,764, filed on Mar. 14, 2007, now Pat. No. 7,391,491, which is a continuation of application No. 10/367,732, filed on Feb. 19, 2003, now Pat. No. 7,209,202.

(30) Foreign Application Priority Data

Mar. 19, 2002 (JP) ................................. 2002-077161

(51) Int. Cl.
G02F 1/1333 (2006.01)
G02F 1/1335 (2006.01)
(52) U.S. Cl. ........................................ 349/122; 349/137
(58) Field of Classification Search .................. 349/137, 349/12, 122
See application file for complete search history.

(56) References Cited

U.S. PATENT DOCUMENTS

| | | | |
|---|---|---|---|
| 4,715,686 A * | 12/1987 | Iwashita et al. | 349/137 |
| 5,870,160 A | 2/1999 | Yanagawa et al. | |
| 6,034,757 A | 3/2000 | Yanagawa et al. | |
| 6,191,837 B1 | 2/2001 | Fujimaki et al. | |
| 6,375,328 B2 | 4/2002 | Hashizume et al. | |
| 6,464,822 B1 | 10/2002 | Choi et al. | |
| 6,726,330 B2 | 4/2004 | Kitabayashi | |
| 6,800,378 B2 | 10/2004 | Hawa et al. | |
| 6,917,400 B2 | 7/2005 | Nakamura et al. | |
| 6,949,284 B2 | 9/2005 | Yoshihara et al. | |
| 7,268,770 B1 * | 9/2007 | Takahata et al. | 345/173 |
| 7,372,510 B2 * | 5/2008 | Abileah | 349/12 |
| 2002/0127408 A1 | 9/2002 | Nishida et al. | |
| 2002/0141064 A1 | 10/2002 | Chu et al. | |
| 2002/0187371 A1 | 12/2002 | Nakajima | |

FOREIGN PATENT DOCUMENTS

| | | |
|---|---|---|
| JP | A-02-129808 | 5/1990 |
| JP | A-02-130526 | 5/1990 |
| JP | A-03-085526 | 4/1991 |
| JP | A-01-283504 | 2/1992 |
| JP | A-04-051220 | 2/1992 |
| JP | A-04-324430 | 11/1992 |
| JP | A-06-018931 | 1/1994 |
| JP | A-10-293207 | 11/1998 |

(Continued)

*Primary Examiner* — James Dudek
(74) *Attorney, Agent, or Firm* — Oliff & Berridge, PLC

(57) ABSTRACT

The invention provides, an electro-optic device that can include a pair of substrates sandwiching an electro-optic substance therebetween. The electro-optic device can further include a coating member including an antistatic material and being disposed on a surface not opposing the electro-optic substance of at least one of the pair of substrates. Accordingly, problems of dust adhesion on the surface of the electro-optic device and dust projection can be solved so as to enable images with high quality to be displayed.

6 Claims, 9 Drawing Sheets

FOREIGN PATENT DOCUMENTS

| | | |
|---|---|---|
| JP | A-11-133510 | 5/1999 |
| JP | A-11-160703 | 6/1999 |
| JP | A-11-305007 | 11/1999 |
| JP | A-2000-147208 | 5/2000 |
| JP | A-2000-194010 | 7/2000 |
| JP | A-2000-305113 | 11/2000 |
| JP | A-2001-167637 | 6/2001 |
| JP | A-2001-195006 | 7/2001 |
| JP | A-2001-290120 | 10/2001 |
| JP | A-2001-343661 | 12/2001 |
| JP | A-2002-014421 | 1/2002 |
| KR | 2000-0016702 | 3/2000 |
| KR | 2002-0014997 | 2/2002 |

* cited by examiner

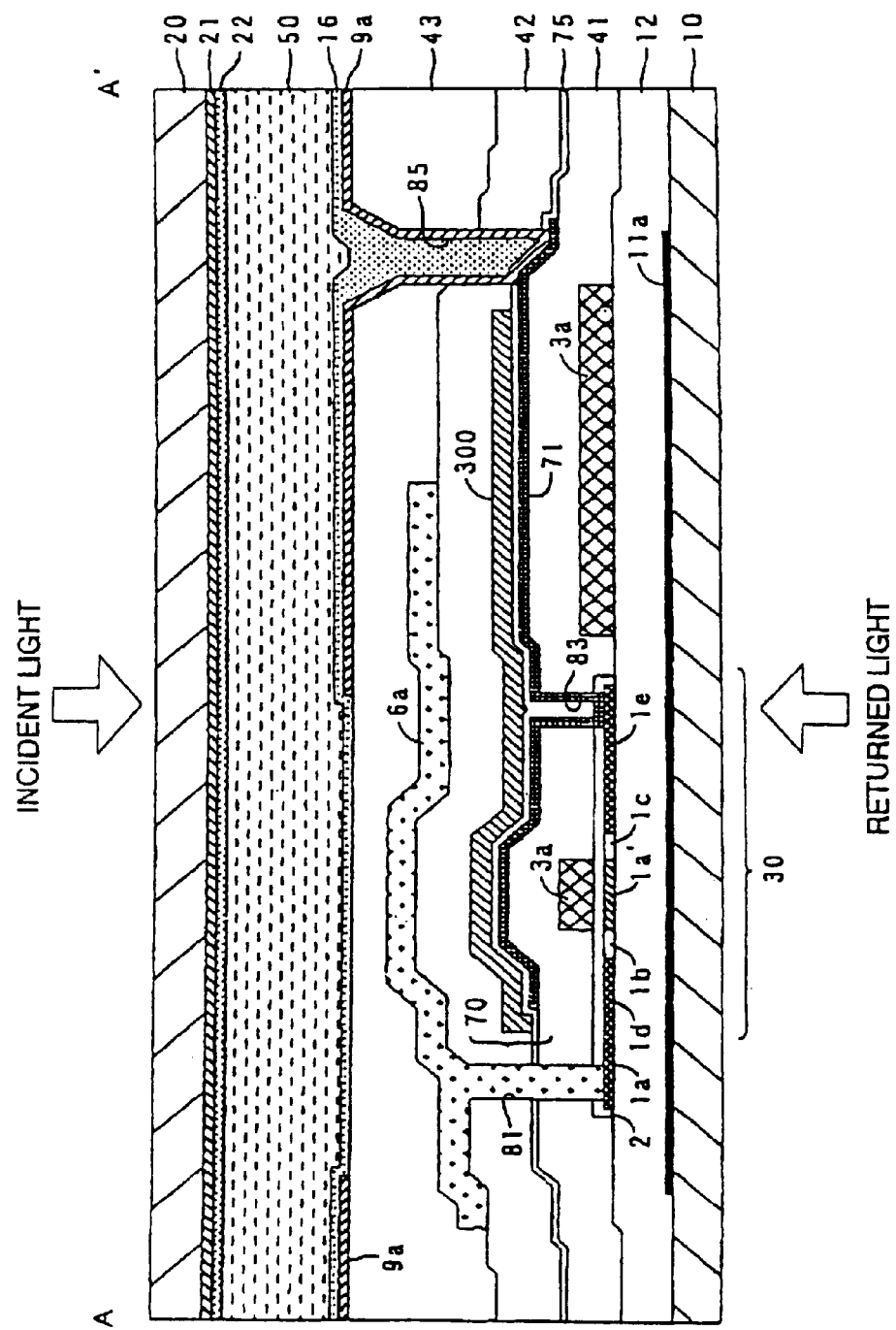

ELECTRO-OPTIC DEVICE, ELECTRONIC INSTRUMENT, AND PROJECTION DISPLAY

This is a Continuation of application Ser. No. 12/149,983 filed May 12, 2008 which in turn is a Continuation of application Ser. No. 11/717,764 filed Mar. 14, 2007, which in turn is a Continuation of application Ser. No. 10/367,732 filed Feb. 19, 2003. The disclosures of the prior applications are hereby incorporated by reference herein in their entirety.

BACKGROUND OF THE INVENTION

1. Field of Invention

The present invention relates to a technical field of an electro-optic device and an electronic instrument. More particularly the present invention relates to the technical field of the electro-optic device and a projection display preferably incorporated in a light valve of the projection display that is an example of the electronic instrument.

2. Description of Related Art

Currently, an electro-optic device, such as a liquid crystal display capable of active matrix driving is known, which can include pixel electrodes arrayed in a matrix arrangement, thin film transistors (referred to below as TFTs) connected to each of the electrodes, and scanning lines and data lines, which are connected each of the TFTs and respectively arranged in parallel with line and row directions. Such an electro-optic device has been widely used as a light valve of a projection display, for example. The projection display can include an optical system for guiding light emitted from a light source to the light valve and another optical system for guiding the light transmitted through the light valve to a screen. At this time, controlling the light transmittance for each pixel enables images to be displayed on the screen. Despite the fact that the projection display is rather compact, the images can be enlarged by the latter optical system, thereby enabling an image in comparatively large size to be displayed.

Furthermore, a projection display of such type capable of color displaying is known, where three of the light valves, i.e., the electro-optic devices are prepared and three colors such as red, blue, and green are respectively projected to the three electro-optic devices so as to be combined by an appropriate prism to form a color image.

SUMMARY OF THE INVENTION

However, the following problems have been encountered in a conventional electro-optic device, especially in a projection display using the electro-optic device as a light valve. That is, in the projection display mentioned above, when dust or grime (referred to below as dust simply) adheres on the surface of the light valve, the dust image is also projected on the screen, which reduces image quality.

Then, in order to solve such a problem, a dust-proof glass with a predetermined thickness has been conventionally bonded on the surface of the light valve. Therefore, dust adheres on the dust-proof glass so as to prevent the dust from being projected on images. This is because light emitted from a light source is generally condensed and focused at a predetermined position within the light valve (a liquid crystal layer, for example) and then it is enlarged, and thereby the dust adhering on the dust-proof glass with a predetermined thickness exists at a position out of the focus (i.e., being defocused), so that the dust cannot be projected on the screen.

However, as described above, in using such a dust-proof glass it is required to have "the predetermined thickness" for the dust-proof glass. This is because if the dust-proof glass has a thickness smaller than this predetermined thickness, the sufficient defocus effect mentioned above cannot be obtained. The value of "the predetermined thickness" here is generally comparatively large, such as 2 mm, for example, or several millimeters case by case.

Taking into account that miniaturization and high fineness are generally demanded for the projection display or the electro-optic device, the above measure can be counter productive. For example, in a liquid crystal display as an example of the electro-optic device, the distance between two substrates opposing each other and sandwiching a liquid crystal layer therebetween, which is called a cell gap, has a gap around 3 to 5 µm, or less. In this state, adding the dust-proof glass having the above-predetermined thickness, which surpasses the above values by far, does not result in miniaturization and high fineness.

When the "thick" dust-proof glass mentioned above is provided, it also becomes problem that the heat produced by the electro-optic device is difficult to be dissipated outside. This is because if heat more than allowable is accumulated within the electro-optic device, the entire device cannot operate in a stable state. Such a problem is concerned especially when the electro-optic device is used as the light valve of the projection display. This is because a comparatively high power light source is generally used in the projection display, so that more heat tends to accumulate within the electro-optic device.

In view of such problems, it is understood that solving the dust projection problem only by the dust-proof glass is not a preferable solution.

The present invention has been made in view of the problems described above, and it is an object thereof to provide an electro-optic device and an electronic instrument having the electro-optic device, in which by solving a dust projection problem, high-quality images can be displayed. Additionally, miniaturization of the devices can be achieved and the stable operation thereof can be performed without heat accumulated therewithin. It is another object of the present invention to provide a projection display as an example of the electronic instrument.

In order to solve the problems described above, an electro-optic device according to the present invention can include a pair of substrates sandwiching an electro-optic substance therebetween, a display electrode disposed above one of the pair of substrates, and wiring electrically connected to the display electrode directly or via a switching element. The device can also include a coating member having an antistatic material and that is disposed on the surface not opposing the electro-optic substance of at least one of the pair of substrates.

According to the electro-optic device of the present invention, by applying an appropriate voltage to the display electrode formed on the pair of substrates via the wiring, an electric field can be applied to the electro-optic substance so as to change the state thereof. At this time, by projecting light transmitting from the surface not opposing the electro-optic substance of at least one of the pair of substrates toward that of the other of the pair of substrates, an image can be displayed. This is because the transmittance can be changed according to the change of state of the electro-optic substance, enabling gradation display to be performed corresponding to the change.

According to the present invention, the coating member can include an antistatic material that is provided on the surface not opposing the electro-optic substance of at least one of the pair of substrates. Thereby, the dust projection problem described above can be effectively solved.

The dust adhesion frequently encountered in the past results from that dust usually builds up static electricity. That is, if the material to be stuck has a high electric resistance, the adhesion is extremely liable to occur by an electrostatic force exerted between the material and dust. Whereas according to the present invention, as described above, there is provided a coating member comprising an antistatic material, so that dust with static electricity produced therein can be prevented from adhering thereon in advance.

Therefore, the electro-optic device according to the present invention makes it possible to prevent dust image from being projected in advance, enabling high quality images to be displayed. Moreover, this is because the dust adhesion to the electro-optic device itself is prevented in advance. It is quite different from a conventional concept (defocusing, for example).

Accordingly, according to the present invention, a conventionally used dust-proof glass is not necessarily required, so that cost can be reduced correspondingly and the miniaturizing of the electro-optic device can be achieved. Also, the heat accumulated within the electro-optic device may be easily dissipated outside. These advantages of the present invention are highly important because the conventional dust-proof glass generally has a large thickness as described above.

Additionally, the coating member including an antistatic material can include a conformation in which the surface of the coating member is coated with powder including the antistatic material, in addition to the case where the entire coating member consists of the antistatic material.

According to the present invention, the display electrode can be the pixel electrode arrayed in a matrix arrangement formed on one of the pair of substrates while being the opposing electrode (common electrode) formed on the entire surface of the other of the pair of substrates. Also, the switching electrode can be the TFT or thin film diode (TFD). By these elements, the active matrix driving can be performed.

Furthermore, another example of the display electrode can also be assumed to be striped electrodes formed on the respective pair of substrates and intersecting each other. By these elements, the passive matrix driving can be performed.

In one mode of the electro-optic device according to the present invention, the coating member may be provided on the other of the pair of substrates. According to this mode, in the electro-optic device capable of active-matrix driving, the coating member is formed on the opposing substrate, so that it is typically arranged on the plane of incidence. Therefore, according to this mode, the dust adhesion on the plane of incidence can be prevented. Especially in this mode, the coating member may be preferably provided on a dust-proof glass formed on the other of the pair of substrates.

By such a configuration, there is provided a conventional dust-proof glass in addition to the coating member according to the present invention. Therefore, according to the mode, while the dust-adhesion preventing effect is counted on the coating member, even when dust adheres thereto, the device can also benefit from the effects of defocusing described above, so that the dust-projection problem is more difficult to be produced, enabling more high-quality images to be displayed.

The dust-proof glass according to the mode, may be the same in the material and structure as a conventional one, however, the thickness can be reduced smaller than the conventional one. This is because there is provided the coating member according to the mode. Therefore, also in this mode, the reduction in manufacturing cost and size of the electro-optic device and the dissipation of heat within the electro-optic device can be achieved correspondingly.

From such situations, according to the mode, the trade-off relationship may be found between the dust-projection preventing effect and the effect of miniaturizing and heat-dissipation of the electro-optic device. That is, if the thickness of the dust-proof glass is increased, the former effect is more secured and the latter is reduced, and vice versa if the thickness is reduced. The thickness of the dust-proof glass according to the mode is determined in view of such situations. More specifically, the thickness may be appropriately determined principally, experientially, experimentally, or with simulation.

According to another mode of the electro-optic device, the coating member may constitute at least part of an anti-reflection coat. According to this mode, the coating member constitutes at least part of the anti-reflection coat generally bonded on the external surface of the electro-optic substance as a constituent element, so that the entire device can be simplified and made more efficient.

The anti-reflection coat is a member disposed on an interface, across which the refractive index changes, such as the interface between air and a glass substrate, and it is an optical element for efficiently guiding light from air to the glass substrate or vice versa, for example, with producing light reflection on the interface as small as possible. According to the mode, the anti-reflection coat may adopt any of various generally known configurations.

The coating member may constitute at least part of the anti-reflection coat according to the mode, so that under certain circumstances, the case, where the entire anti-reflection coat is a coating member, i.e., the entire anti-reflection coat serves as the coating member, may be adapted to the device.

More specifically in the mode, cases are assumed where the anti-reflection coat is constituted of a conductive material and the anti-reflection coat is constituted of an antistatic material. According to this mode, the anti-reflection coat may preferably have a multi-layered structure in particular. In such a structure, the multi-layered structure may be provided with one arbitrary layer of the coating member or not less than two layers thereof.

As a more specific mode, there may be adopted a four-layer structure of $ZrO_2$, the coating member including ITO, $SiO_2$, and $ZrO_2$ arranged in that order from the light incident side. Generally, if the top layer is a light-incident plane, the next top layer may preferably include the coating member according to the present invention (the above-mentioned specific mode is an example thereof). Because in this case, the original function of the anti-reflection coat has an accommodating harmonious balance with the function to be exerted by the coating member.

In another mode of the electro-optic device according to the present invention, the coating member including a transparent conductive material. According to this mode, since the coating member is a transparent material, there may be provided a coating member capable of preventing dust adhesion without damaging the transparency or permeability of the entire electro-optic device as a whole.

As for the transparent conductive material according to the mode, there may specifically be ITO (indium tin oxide) or IZO (indium zinc oxide). In this mode, in particular, the coating member including the transparent conductive material may be preferably grounded. Because in such a structure, the dust adhesion preventing operation can be more securely demonstrated. If the coating member is at floating potential, this may inversely affect the operation of the electro-optic device such that useless capacity coupling may be possibly produced, whereas, according to the mode, there is no such possibility.

In another mode of the electro-optic device according to the present invention, a separation optical element may be further provided separately from the electro-optic device, and the coating member is provided in the separation optical element. According to this mode, an optical element, which is usually arranged outside the electro-optic device, such as a polarizing plate or a phase contrast plate, is provided separately from the electro-optic device, while the coating member is provided in the separation optical element. Thereby, the following advantages are shown.

In other words, since the polarizing plate or the phase contrast plate is also one of optical elements transmitting light contributed to image formation, if dust adheres on the surface of the optical element, the dust projection problem cannot be effectively solved. Whereas, according to the mode, since the coating member can also be bonded on the polarizing plate or the phase contrast plate, the surface of the polarizing plate or the phase contrast plate is also prevented from being stuck by dust, resulting in efficiently solving the problem of dust projection on images.

Such an advantage is effective especially in the case where parallel light is projected to the optical element according to the mode. Because even when the optical element is separated, a defocusing effect for the parallel light is not sufficiently demonstrated.

According to the mode, even when the coating member is provided separately from the electro-optic device, there can be no problem if in addition to the above coating member, another coating member is provided and directly bonded on at least one of the pair of the substrates constituting the electro-optic device. That is, for example, there may be both of coating members bonded on both surfaces of the electro-optic device and coating members bonded on both surfaces of the polarizing plate or the phase contrast plate mentioned above (in this case, four coating members existing in total). Under certain circumstances, the coating member may be obviously provided only on the separately arranged optical element.

As described above, in the structure where the polarizing plate or the phase contrast plate is provided separately from the electro-optic device, the following advantages based on the structure itself can be obtained. That is, if the optical element such as the polarizing plate or the phase contrast plate is directly bonded on at least one of the pair of the substrates constituting the electro-optic device, when a comparatively large pin hole exists in the optical element, a pin-hole projection problem arises in the same way as the dust projection problem. However, in this mode, there is scarcely such apprehension. Because the polarizing plate or the phase contrast plate is provided separately from the electro-optic device, so that the defocusing effect may be expected accordingly. This fact is applicable to the case where a plurality of the optical elements are provided and they are bonded together with an appropriate adhesive. Because if the adhesive includes dust, the projection problem of the dust in the adhesive may arise in the same way as described above.

Finally, according to this mode, the design rule about the optical element such as the polarizing plate or the phase contrast plate can be alleviated. That is, even when a comparatively large pin hole exists in the optical element, or dust comes to stay in between a plurality of optical elements (between the polarizing plate and the phase contrast plate, for example), they cannot be projected on images by virtue of the defocusing effect. Accordingly, according to the mode, a totally inexpensive electro-optic device can be provided.

In another mode of the electro-optic device according to the present invention, an electrical resistance of the coating member is $10^{12}\Omega$ or less. According to this mode, the electrical resistance of the coating member may be pertaining to any one of an antistatic region, a conductive region, and a conductor region, so that the dust-adhesion preventing effect described above can be more securely expected.

In order to solve the problems described above, an electro-optic device according to the present invention can include a pair of substrates sandwiching an electro-optic substance therebetween, a display electrode disposed on one of the pair of substrates, wiring connected to the display electrode directly or via a switching element, and a coating member disposed on a surface not opposing the electro-optic substance of at least one of the pair of substrates, the coating member including a surface-active agent at least on the surface.

According to the electro-optic device of the present invention, in the same way as the electro-optic device described above, through electric field application on an electro-optic substance and changes of state of the electro-optic substance caused by the electric field application, images can be displayed.

According to the present invention, the coating member is provided on a surface not opposing the electro-optic substance of at least one of the pair of substrates, and the coating member includes a surface-active agent at least on the surface. A surface-active agent can be classified broadly into an anionic type and a cationic type, any one of these may be used according to the present invention. At all events, by the behavior of the surface-active agent, dust adhesion can be prevented in advance according to the present invention. Because this is just such a situation that the dust adhesion may be mainly caused by an electrostatic force as described above. Therefore, also in the electro-optic device according to the present invention, the dust projection can be prevented in advance, enabling high-quality images to be displayed.

In order to solve the problems described above, an electronic instrument according to the present invention can include the above-described electro-optic device according to the present invention (including various modes described above). Since the electronic instrument according to the present invention can include the above-described electro-optic device according to the present invention, various electronic instruments capable of displaying high-quality images substantially without dust-projection problem can be achieved, such as a liquid crystal TV, mobile phone, electronic pocket book, word processor, viewfinder or direct-view monitor video tape recorder, workstation, phonovision, POS terminal, touch panel, and the like.

In order to solve the problems described above, a projection display according to the present invention can include a light valve having the above-described electro-optic device according to the present invention (including various modes described above), a light source for sending projection light to the light valve, an optical system for projecting the projection light emitted from the light valve, and a blower for blowing air to the light valve.

According to the projection display of the present invention, the light emitted from the light source is projected to the electro-optic device as the light valve, and then enlarged by the optical system after being emitted from the electro-optic device, enabling a comparatively large images to be projected on a screen. Also, according to the present invention, the blower for blowing air to the light valve is provided, which enables the light valve to be cooled.

In the present invention, the blower can provide the following advantages. In the projection display of the present invention, since the light valve includes the above-described electro-optic device according to the present invention, heat dissipation from the light valve is facilitated by eliminating the dust-proof glass or reducing the thickness thereof, as already described. Therefore, the blower according to the present invention is not required to have large power, because with not large power, sufficient cooling can be performed. Therefore, according to the present invention, the power consumption required for the blower can be reduced, and so-called hissing sound generated by the blower can be reduced because the power may be reduced, enabling a quiet projection display to be provided.

Also, according to the blower of the present invention, the dust coming close to adhere on the surface of the light valve can be blown off just before adhesion. Since the light valve of the present invention particularly includes the above-described electro-optic device according to the present invention, dust adhesion can be prevented by its own in a considerable high degree of certainty. This advantage can be more enhanced by adding the blower. Therefore, according to the projection display of the present invention, images with higher quality can be displayed.

Such operations and other advantages of the present invention will become apparent as the following description of embodiments proceeds.

BRIEF DESCRIPTION OF THE DRAWINGS

The invention will be described with reference to the accompanying drawings, wherein like numerals reference like elements, and wherein:

FIG. 10 is a sectional view at the line A-A' of FIG. 9.

DETAILED DESCRIPTION OF PREFERRED EMBODIMENTS

Exemplary embodiments according to the present invention will be described below with reference to the drawings. In the embodiments below, an electro-optic device according to the present invention is incorporated in a liquid crystal apparatus.

Figure 1:
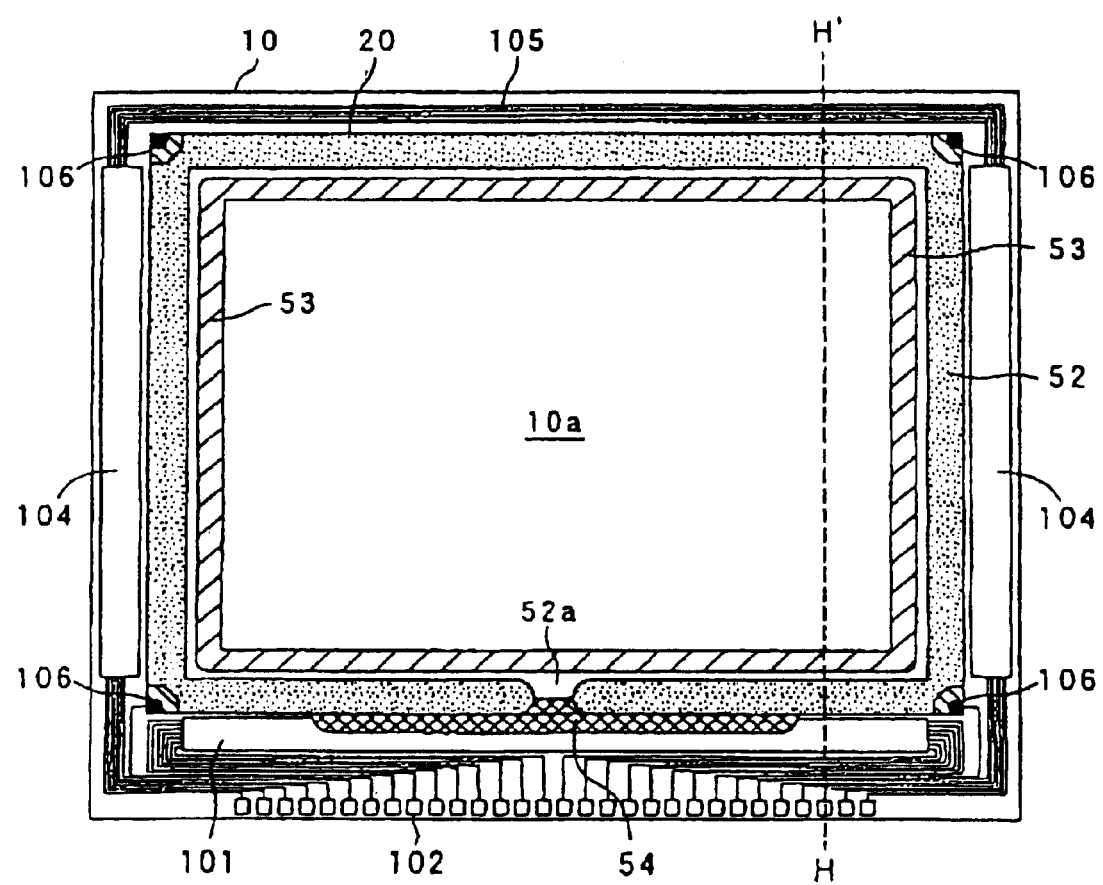
FIG. 1 is a plan view of a TFT array substrate in an electro-optic device according to an exemplary embodiment of the present invention viewed with various elements mounted thereon from an opposing substrate.
Figure 2:
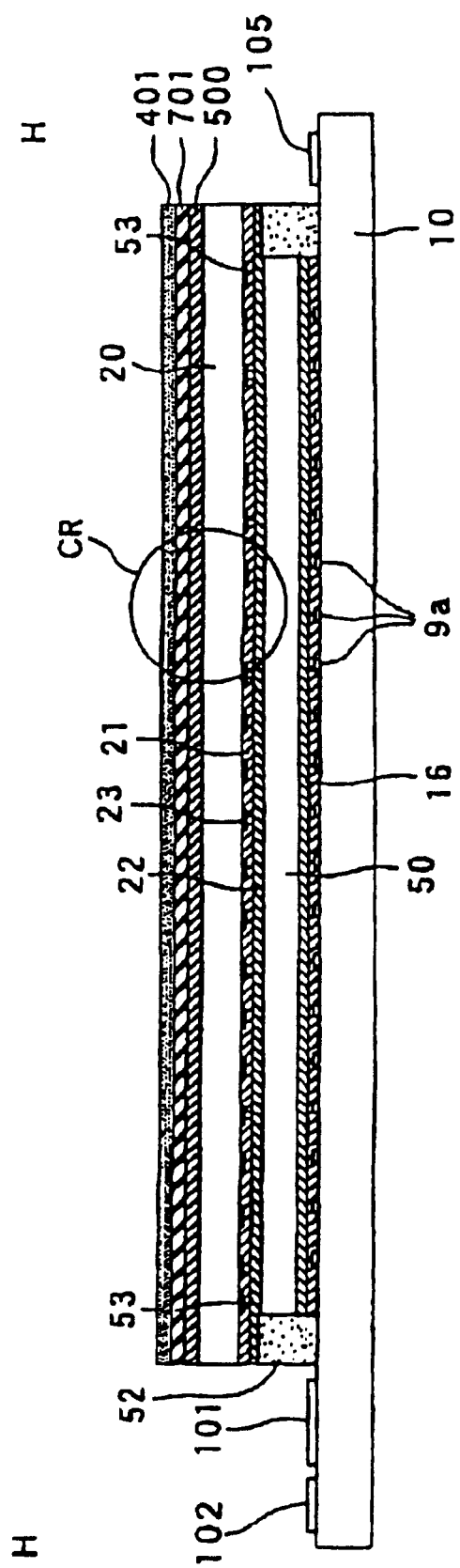
FIG. 2 is a sectional view at the line H-H' of FIG. 1.
Figure 3:
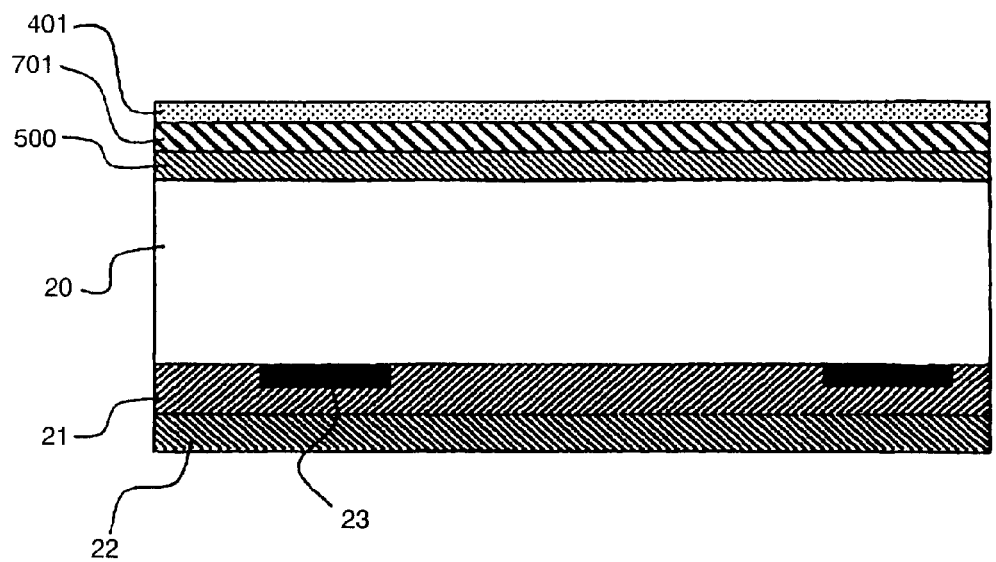
FIG. 3 is an enlarged view of a first embodiment of the present invention showing the inside the circle indicated by symbol CR in FIG. 2.

First, the entire structure of an electro-optic device according to a first embodiment will be described with reference to FIGS. 1 to 3. FIG. 1 is a plan view of a TFT array substrate having various elements mounted thereon and viewed from an opposing substrate 20; FIG. 2 is a sectional view at the line H-H' of FIG. 1; and FIG. 3 is an enlarged view of inside the circle indicated by symbol CR in FIG. 2. In addition, in order that layers and members have recognizable sizes in FIG. 3, they are displayed thereon with respectively different contraction scales.

Referring to FIGS. 1 and 2, the electro-optic device according to the first embodiment can include a TFT array substrate 10 and the opposing substrate 20, which are arranged to oppose each other. Between the TFT array substrate 10 and the opposing substrate 20, a liquid crystal 50 is enclosed, and the TFT array substrate 10 and the opposing substrate 20 are bonded together with a sealing material 52 provided on a sealing region located in the periphery of an image display region 10a. The liquid crystal 50 can be supplied by blending one kind or several kinds of nematic liquid crystal so as to have a predetermined oriented state between a pair of oriented films, which will be described in greater detail below.

The image display region 10a is defined by a region having pixel electrodes 9a arrayed in a matrix arrangement, TFTs connected to each of the pixel electrodes 9a, scanning lines and data lines connected to the TFTs (each of them will be described below with reference to FIGS. 8 to 10) formed on the TFT array substrate 10, or the image display region 10a is also defined by a region opposing the above region and having an opposing electrode 21 formed on the opposing substrate 20, the region being defined by a square framed light-shielding film 53 shown in FIG. 1.

Through the image display region 10a, light can transmit from this side of the plane of FIG. 1 toward the other side when facing the plane (i.e., from the opposing substrate 20 toward the TFT array substrate 10), resulting in contributing to image display. This is because the pixel electrode 9a, part of the pixel electrode 9a, or the opposing electrode 21 is made of a transparent material while the state of the liquid crystal 50 is changed by applying an electric field to each of the pixel electrodes 9a. Also, one pixel is defined by one unit including at least any one of one pixel electrode 9a and one TFT.

The sealing material 52, as shown in FIG. 1, is provided so as to surround the image display region 10a. However, in order to bring liquid crystal within the clearance sandwiched between the TFT array substrate 10 and the opposing substrate 20, as shown in the lower portion of FIG. 1, a cut-out is formed in part of the sealing material 52 as a liquid crystal filling port 52a. In the completed electro-optic device, in order to prevent the liquid crystal 50 brought into the clearance from leaking outside, a sealing material 54 made of a UV-curable thermosetting acrylic resin is used in a portion corresponding to the liquid crystal filling port 52a.

The sealing material 52 may be made of a UV-curable resin or a thermosetting resin, for example. In order to bond the TFT array substrate 10 and the opposing substrate 20 together, both the substrates 10 and 20 are pushed by an appropriate pressure applied thereto, and the sealing material is irradiated with a UV ray if the sealing material is the UV-curable resin, or it is heated if it is the thermosetting resin, so as to be cured.

Also, the sealing material 52 contains gap materials (not shown) dispersed therein as a kind of spacer so as to have a predetermined cell gap, which is the gap space between both the substrates 10 and 20. The gap material is generally made of glass fiber or glass beads having a substantially spherical shape.

Referring to FIG. 2, on the TFT array substrate 10, there are provided an oriented film 16 formed over the pixel electrode 9a having the TFTs for switching pixels and wiring such as scanning lines and data lines already formed therein. On the other hand, on the opposing substrate 20, there can be provided an upper light-shielding film 23 arrayed in a lattice that defines an aperture region substantially corresponding to a region having the pixel electrode 9a formed thereon, the opposing electrode 21 made of a transparent material, such as ITO, and formed on the upper light-shielding film 23, and an oriented film 22 further formed on the opposing electrode 21 by a coating process, sintering process, and rubbing treatment.

According to the first embodiment in particular, as shown in FIG. 2 and FIG. 3 which is an enlarged view of part of FIG. 2, the opposing substrate 20 can be provided with an AR (anti-reflection) coat 500, a polarizing plate 701, and a coating member 401 formed on the side not opposing the liquid crystal 50 (an upper portion of FIG. 3) and arranged in that order from the opposing substrate 20. Among them, the AR coat 500 is constituted of a single layer or a plurality of layers of zirconia ($ZrO_2$) or silica ($SiO_2$). For example, the AR coat 500 may have a four-layer structure of zirconia, silica, zirconia, and silica, or it may also have a multi-layered structure more than four layers by repeating the zirconia and silica. Thereby, in between members having different refractive indexes, such as from an airspace (an upper portion of FIG. 3) to inside the opposing substrate 20 (a lower portion of FIG. 3), loss due to useless reflection can be avoided enabling efficient light-guide between the members to be performed. The polarizing plate 701 properly polarizes light to be incident in the liquid crystal 50. Thereby, when there is a predetermined relationship between the polarizing state and the oriented state by properly determining the oriented state of the liquid crystal 50, incident light, which is polarized light, substantially perfectly transmits the members, from which adjustment can be performed until the state that the incident light is substantially perfectly shielded.

The coating member 401, being characteristic in the first embodiment, made of ITO which is an example of a transparent conductive material. At least part of the coating member 401 is connected to electrical wiring so as to be grounded.

Other than the configuration described above, in FIGS. 1 to 3, on a region outside the sealing member 52, there are provided a data-line driving circuit 101 that drives the data line, which will be described later, by supplying an image signal to the data line at a predetermined timing and external-circuit connection terminals 102 formed along one side of the TFT array substrate 10, while scanning-line driving circuits 104 can be formed along two sides adjacent to the one side for driving the scanning line, which will be described later, by supplying an image signal to the scanning line at a predetermined timing. In addition, as long as the delay of the scanning signal supplied to the scanning line is not important, it is of course enough to have one scanning-line driving circuit 104 on one side. Also, the data-line driving circuits 101 may be arranged along sides of the image display region 10a on both sides.

On the one remaining side of the TFT array substrate 10, a plurality of lines of wiring 105 are arranged for connecting between the scanning-line driving circuits 104 arranged on both sides of the image display region 10a. Also, at least at one position of corners of the opposing substrate 20, a vertically conducting material 106 is provided for conducting electricity between the TFT array substrate 10 and the opposing substrate 20.

On the TFT array substrate 10, in addition to the data-line driving circuit 101 and the scanning-line driving circuit 104, there may be provided a sampling circuit for applying an image signal to a plurality of data lines 6a at a predetermined timing, a pre-charge circuit for supplying a pre-charge signal in a predetermined voltage level to a plurality of the data lines 6a prior to the image signal, and a checking circuit for checking the quality or a defect of the electro-optic device during manufacturing or at shipment.

The electro-optic device configured as above according to the first embodiment has the following advantages because of the existence of the coating member 401 described above.

First, according to the first embodiment, dust scarcely adheres on the most external surface of the electro-optic device (the highest surface of FIG. 3) by providing the coating member 401 having ITO which is an example of the transparent conductive material. This is because the coating member 401 has electrical conductivity, which prevents the charged dust from adhering in advance by an electrostatic force. Therefore, according to the first embodiment, high-quality images can be displayed substantially eliminating the problem of dust projection.

According to the electro-optic device of the first embodiment, as shown in FIGS. 2 and 3, the dust-proof glass need not be provided. This is because it is not substantially necessary to worry about the dust adhesion any more by means of the effect of the coating member 401 described above. Therefore, according to the first embodiment, conventional problems due to the dust-proof glass having a comparatively large thickness for achieving the dust projection problem cannot be produced. In other words, in the first, the cost due to the dust-proof glass can be eliminated, in the second, the entire electro-optic device can be miniaturized, and at the third, the heat accumulated within the electro-optical device can be easily dissipated outside so as to achieve the precise operation of the electro-optic device.

As described above, according to the first embodiment, the advantages described above can be achieved.

In addition, the coating member 401 is made of ITO in the above description; alternatively, an IZO, which is another example of the transparent conductive material, may be used. Also, the coating member 401 is not necessarily to be a conductive material, and in view of the operation to prevent charged dust from adhesion, the coating member 401 may be made of at least an antistatic material. There are various such materials; more specifically, when a material having an electrical resistance of $10^{12}\Omega$ or less for the coating member 401 is selected, a reasonable effect of preventing the dust adhesion may be expected.

Moreover, according to the present invention, instead of the above configuration, or in addition thereto, a surface-active agent may be contained within the surface of the coating member. Even in this configuration, substantially the same advantage as the above configuration can be obtained. This is because a surface-active agent having an antistatic effect is known (in particular an anionic system, for example) and when this is provided on the surface of the coating member, the effect of preventing the dust adhesion may be expected.

Also, in FIGS. 2 and 3, the coating member 401 is provided only on the opposing substrate 20, however, it should be understood the present invention is not limited to this configuration. Under certain circumstances, the coating member 401 may be provided only on the TFT array substrate 10, or on both the TFT array substrate 10 and the opposing substrate 20.

Furthermore, in FIGS. 2 and 3, there is provided the polarizing plate 701, however it should be understood that it is not necessarily provided. That is, in such a case, the arrangement is the order of the opposing substrate 20, the AR coat 500, and the coating member 401 from the bottom of FIG. 3. In this case, if the polarizing plate 701 is further provided, it may also be separated from the body of the electro-optic device (see a fourth embodiment which will be described later).

Incidentally, various modifications described above may be incorporated as they are or in an appropriately modified state into several embodiments, which will be described later, and they are of course within the scope of the present invention.

Figure 4:
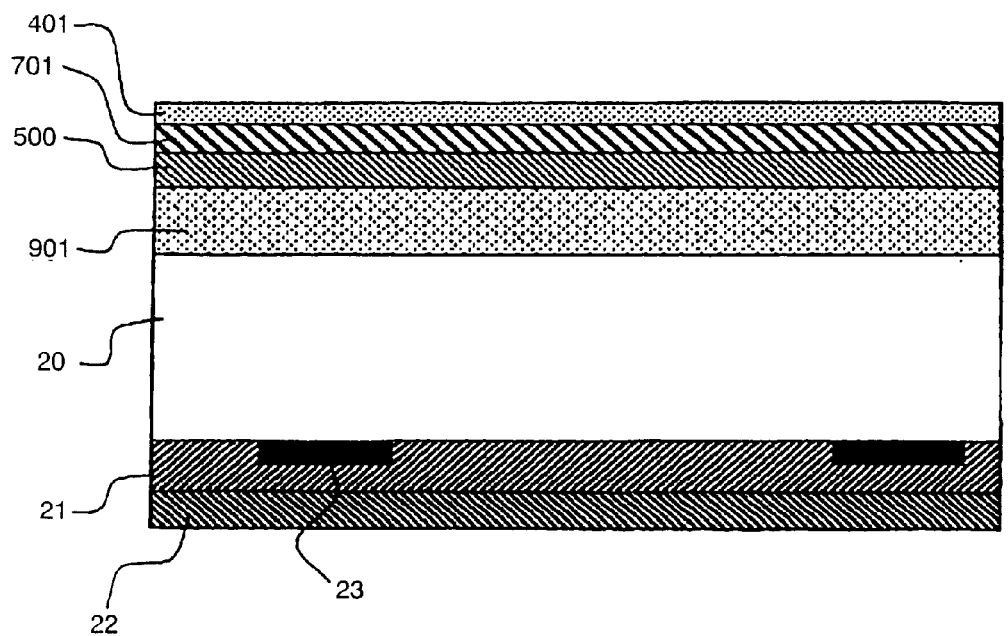
FIG. 4 is a drawing of a second embodiment of the present invention, which is similar to FIG. 3 and different from FIG. 3 in the point that a dust-proof glass is provided.

A second embodiment according to the present invention will be described below with reference to FIG. 4. FIG. 4 is a drawing similar to FIG. 3 showing a mode different from that of FIG. 3. The elements shown in FIG. 4 and designated by like reference characters common to FIG. 3 are the same as those of the first embodiment, so that descriptions thereof are omitted. This is the same as those of from a third embodiment onward, which will be described below.

According to the second embodiment, it differs from the first embodiment in that a dust-proof glass 901 is provided. That is, the opposing substrate 20 is provided with the dust-proof glass 901, the AR coat 500, the polarizing plate 701, and the coating member 401 formed in that order from the opposing substrate 20. The dust-proof glass 901 may be made of an appropriate glass material.

According to the second embodiment described above, while the dust-adhesion preventing effect is counted on the coating member 401, the device can also benefit from the effects of defocusing by the dust-proof glass 901, so that the dust-projection problem is more difficult to be produced. That is, even when dust adheres on the top layer on the plane of FIG. 4, since the position is off a focal point to some extent, the dust image can be prevented in advance from being projected on a screen.

In addition, the thickness of the dust-proof glass 901 can be reduced smaller than the conventional one. Specifically, the thickness of the dust-proof glass has been conventionally required to be 2 mm or more for having sufficient defocusing effects; whereas according to the second embodiment, such a thickness is not necessary. Therefore, also in the second embodiment, the reduction in size of the electro-optic device and easiness of the heat dissipation can be enjoyed according to the reduction in thickness.

Figure 5:
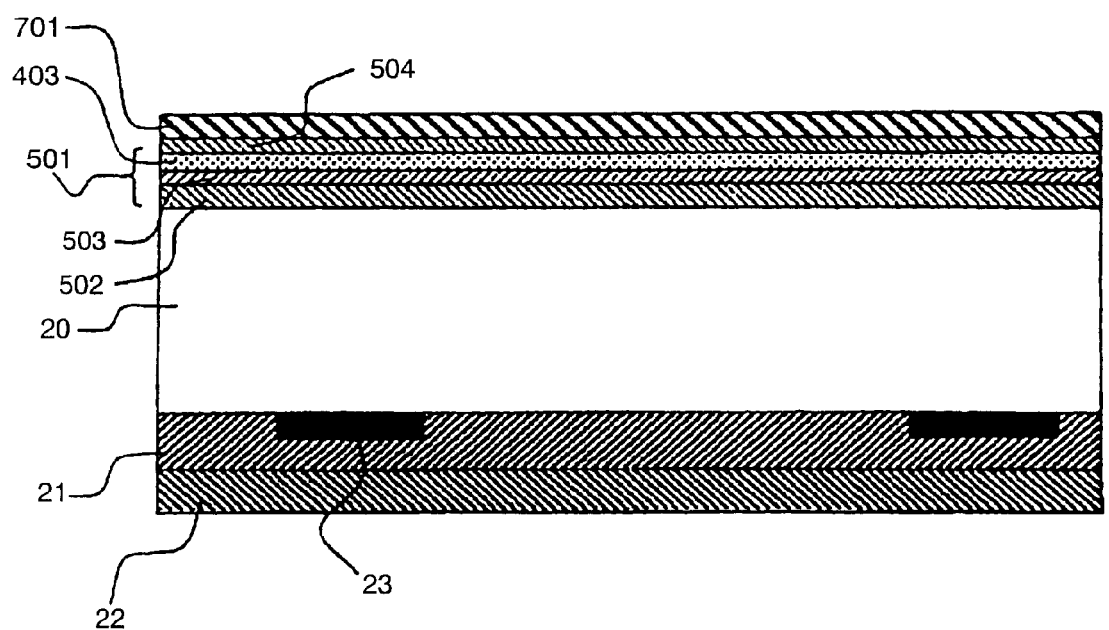
FIG. 5 is a drawing of a third embodiment of the present invention, which is similar to FIG. 3 and different from FIG. 3 in a structure of an AR coat.

A third embodiment according to the present invention will be described below with reference to FIG. 5. FIG. 5 is a drawing similar to FIG. 3 showing a mode different from that of FIG. 3.

According to the third embodiment, it differs from the first embodiment in that an AR coat 501 has characteristic features. In other words, as shown in FIG. 5, the AR coat 501 has a four-layer structure of a first zirconia layer 502, a silica layer 503, an ITO layer 403, and a second zirconia layer 504 arranged in that order from the bottom of the plane of the figure. Among them, the ITO layer 403 corresponds to an example of "the coating member" according to the present invention. That is, according to the third embodiment, the AR coat 501 itself has conductivity. Even such a structure obviously demonstrates substantially the same effects as those of the first embodiment.

According to the present invention, in addition to the configuration of the AR coat 501 described above, it should be understood that other various configurations may be obviously adopted. For example, in a multi-layered structure, in which a zirconia layer and a silica layer appear alternately, one arbitrary layer or not less than two layers may be an ITO layer which is the coating member. However, in general, the next top layer may preferably include the coating member comprising an anti-static material according to the present invention. Thereby, the original functions of AR coat 501, which are anti-reflection and dust adhesion, can be demonstrated most effectively.

Figure 6:
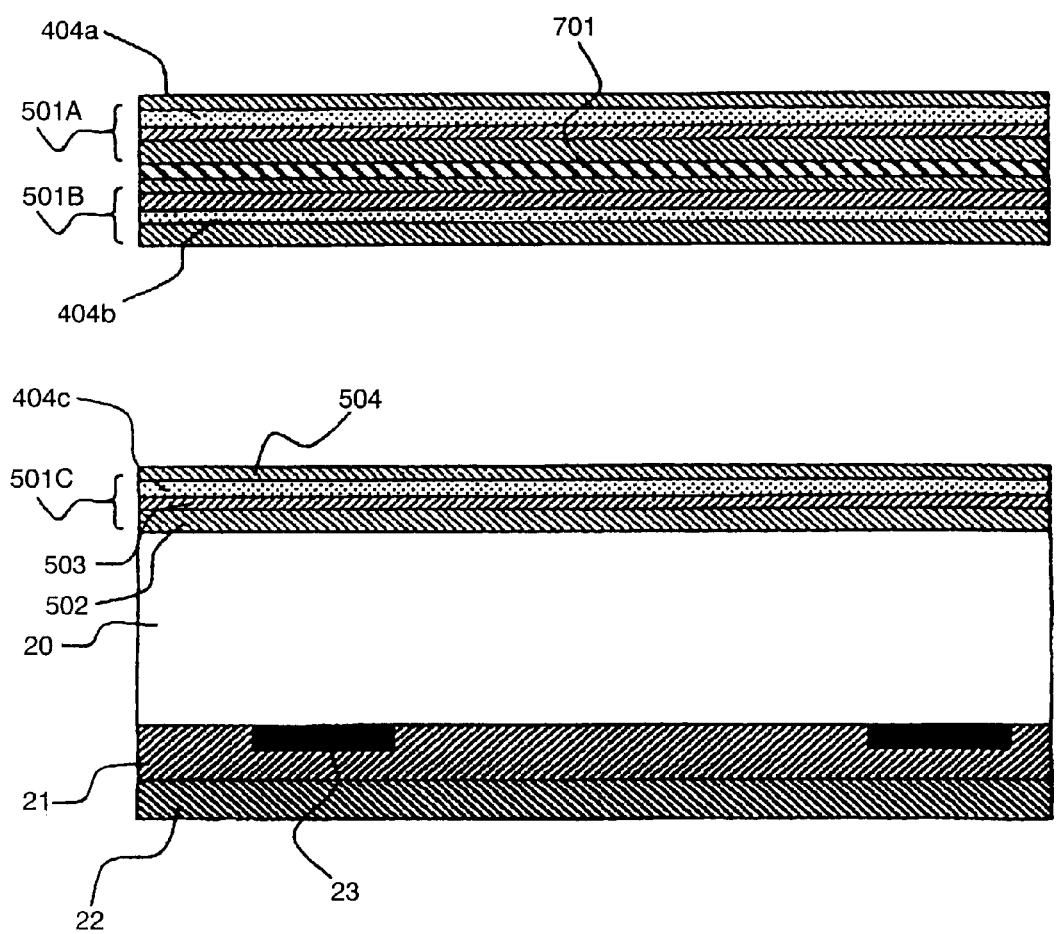
FIG. 6 is a drawing of a fourth embodiment of the present invention, which is similar to FIG. 3 and different from FIG. 3 in the point that a coating member constitutes part of a separation optical element.

A fourth embodiment according to the present invention will be described below with reference to FIG. 6. FIG. 6 is a drawing similar to FIG. 3 showing a mode different from that of FIG. 3.

The fourth embodiment is a modification of the third embodiment. That is, referring to FIG. 6, an AR coat 501A containing a coating member 404a, an AR coat 501B containing a coating member 404b, which are as shown in FIG. 5, and a polarizing plate 701 clamped by these two AR coats 501A and 501B (this united structure is referred to below as a separation optical element) are arranged separately from the surface of the opposing substrate 20. By such a configuration, in the separation optical element, while the dust-adhesion preventing effect is demonstrated by the coating members 404a and 404b, even without the dust-proof glass, since the separation optical element is arranged separately from the electro-optic device body, a predetermined defocusing effect can be obtained. Therefore, according to the fourth embodiment, the dust projection also is scarcely produced on images, enabling high-quality images to be displayed.

Referring to FIG. 6, in addition to the coating members 404a and 404b included in the separation optical element, a coating member 404c exists on the opposing substrate 20 in the electro-optic device itself. This coating member 404c, as shown in the third embodiment, also constitutes part of an AR coat 501C. According to the present invention, either structure, a structure in which the coating member is arranged separately from the electro-optic device as mentioned here or a structure in which the coating member is bonded to the electro-optic device, can be taken without any problems. It would be rather more preferable to take this structure in view of solving the dust-projection problem.

In the above description, the separation optical element is constituted of the AR coats 501A and 501B and the polarizing plate 701, however, it should be understood that the present invention is not limited to such a structure. For example, in addition to the elements shown in FIG. 6, a phase contrast plate may be arranged.

Furthermore, the modification of the third embodiment is only shown in FIG. 6; as for the second to fourth embodiments, the separated separation optical element may be obviously provided identically to FIG. 6.

Figure 7:
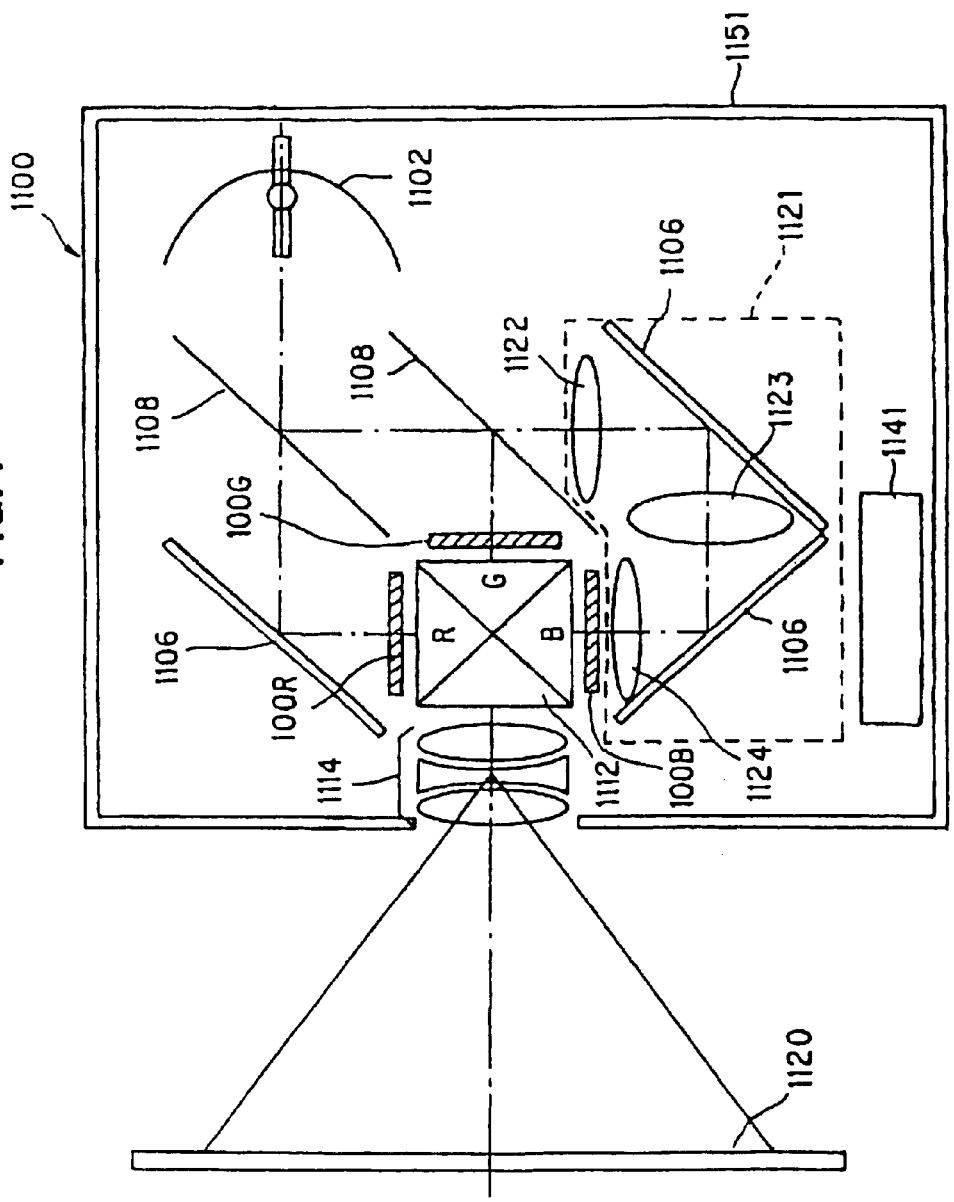
FIG. 7 is a diagrammatic sectional view of a color liquid crystal projector as an example of the projection display.

A fifth embodiment according to the present invention will be described below with reference to FIG. 7. The fifth embodiment is an example in which the electro-optic device according to the embodiments described above is incorporated to a projection display as an example of an electronic instrument. FIG. 7 is a diagrammatic sectional view of a color liquid crystal projector as an example of the projection display.

Referring to FIG. 7, a liquid crystal projector 1100 according to the fifth embodiment as an example of the projection display comprises three liquid crystal modules including a liquid crystal device having a driving circuit mounted on a TFT array substrate, which are prepared for a projector using light valves 100R, 100G, and 100B for R, G, and B, respectively. The electro-optic devices according to the above-described embodiments can be used for the three light valves 100R, 100G, and 100B.

In the liquid crystal projector 1100, projection light emitted from a white-light-source lamp unit 1102, such as a metal halide lamp is divided into optic elements R, G, and B corresponding to the three primary colors R, G, and B by three mirrors 1106 and two dichroic mirrors 1108 so as to be guided to the light valves 100R, 100G, and 100B, corresponding to each color, respectively. At this time, the B light is especially guided via a relay lens system 1121 including an incidence lens 1122, a relay lens 1123, and an output lens 1124 that prevents light loss due to a long optical path. The optic elements corresponding to the three primary colors respectively modulated by the light valves 100R, 100G, and 100B is combined again by a dichroic prism 1112, and then it is projected on a screen 1120 via a projection lens 1114 as color images.

Also, the projection color display is provided with a blower 1141 mounted for sending air to the light valves 100R, 100G, and 100B. It is an object of the blower 1141 to reduce the heat accumulation in the light valves 100R, 100G, and 100B mainly due to powerful light emitted from the lamp unit 1102. These elements mentioned above are totally accumulated within a mould 1151.

According to the fifth embodiment having such a structure, since the electro-optic devices according to the above-described embodiments are incorporated in the light valves 100R, 100G, and 100B, the dust adhesion preventing effect may be demonstrated in the light valves 100R, 100G, and 100B in substantially the same way as described above. In particular, since after the light combing by the dichroic prism 1112, zooming is performed by the projection lens 1114 according to the fifth embodiment as shown in FIG. 7, the advantage that dust adhesion is not produced is especially significant.

Constituting the light valves 100R, 100G, and 100B of electro-optic devices according to the above-described embodiments means that the heat dissipation without the dust-proof glass or by reducing the thickness thereof can be efficiently performed, so that it is not required to have especially high power of the blower 1141 according to the fifth embodiment. Accordingly, a quiet projection color display with consumption power smaller than in a conventional one can be provided. By the existing of the blower 1141, dust, which is coming close to adhere on the light valves 100R, 100G, and 100B, is blown off, so that providing the blower 1141 takes a preferable effect also in this aspect.

The projection display has been described above as an example of the electronic instrument, however, it should be understood that the present invention is not limited to such a structure and the invention can be of course applied to a liquid crystal display for mobile phones and personal computers as another examples of the electronic instrument.

The inside structure of the electro-optic device, such as the structure of a TFT, pixel electrode, scanning line, and data line, which are not described above, and operations thereof will be collectively described below.

Figure 8:
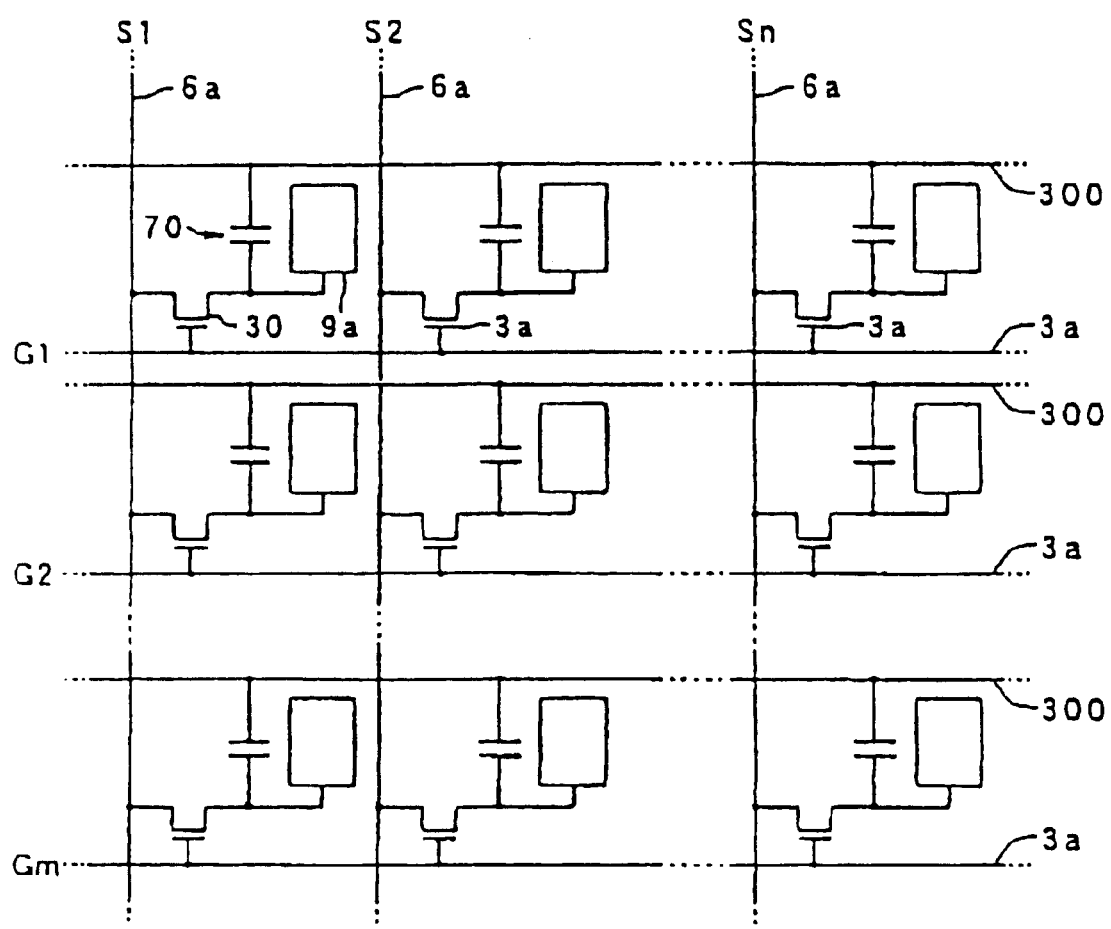
FIG. 8 is an equivalent circuit diagram of various elements and wiring arranged in a plurality of pixels arrayed in a matrix arrangement and constituting an image display region of an electro-optic device according to the embodiment of the present invention.
Figure 9:
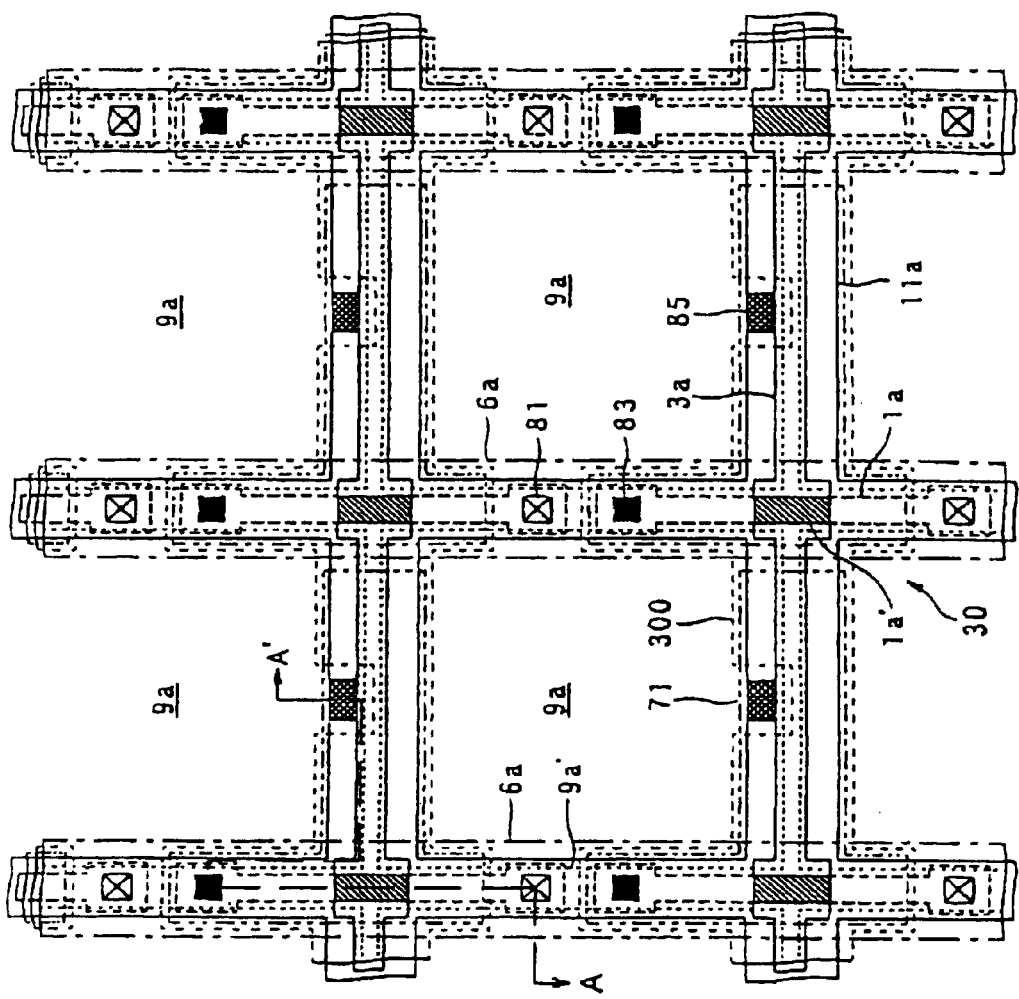
FIG. 9 is a plan view of a plurality of pixel-groups adjacent to each other on a TFT array substrate, on which data lines, scanning lines, and pixel electrodes are mounted.

First, a pixel section of the electro-optic device according to the embodiment of the present invention will be described with reference to FIGS. 8 to 10. FIG. 8 is an equivalent circuit diagram of various elements and wiring in a plurality of pixels arrayed in a matrix arrangement and constituting an image display region of the electro-optic device. FIG. 9 is a plan view of a plurality of pixel-groups adjacent to each other on a TFT array substrate, on which data lines, scanning lines, and pixel electrodes are mounted; and FIG. 10 is a sectional view at the line A-A' of FIG. 9. In addition, in order that layers and members have recognizable sizes in FIG. 10, they are displayed thereon with respectively different contraction scales for each layer and member.

Referring to FIG. 8, in a plurality of pixels arrayed in a matrix arrangement and constituting an image display region of the electro-optic device according to the embodiment, each includes a pixel electrode 9a, a TFT 30 for switching control of the pixel electrode 9a, and a data line 6a electrically connected to a source of the TFT 30, image signals being supplied to the data line. The image signals S1, S2, . . . , Sn to be written in the data line 6a may be sequentially supplied in that order, or they may be supplied for each group to a plurality of the data lines 6a adjacent to each other.

To a gate of the TFT 30, a scanning line 3a is electrically connected, so that scanning signals G1, G2, . . . , Gm are sequentially applied to the scanning line 3a in that order at a predetermined pulsing timing. The pixel electrode 9a is electrically connected to a drain of the TFT 30, into which the image signals S1, S2, . . . , Sn supplied from the data line 6a are written at a predetermined timing by closing the switch of the TFT 30 as a switching element for a predetermined period of time.

The image signals S1, S2, . . . , Sn written into liquid crystal as an example of an electro-optic substance at a predetermined level via the pixel electrode 9a are held for a predetermined period of time in between an opposing electrode formed on the opposing substrate. The orientation or order of molecular assembly of the liquid crystal is changed by a voltage level applied thereto so as to modulate light, enabling gradation display. If being in a normally white mode, the transmittance of incident light decreases corresponding to the voltage applied thereto in pixel units. If being in a normally black mode, the transmittance of incident light increases corresponding to the voltage applied thereto in pixel units, so that the light with contrast corresponding to an image signal is projected as a whole from the electro-optic device.

Wherein, in order to prevent the held image signals from being leaked, a storage capacitance 70 is added in parallel to a liquid crystal capacitance formed between the pixel electrode 9a and the opposing electrode. The storage capacitance 70 is arranged in parallel with the scanning line 3a and includes a capacitance electrode on a fixed potential side and a capacitance line 300 fixed at a constant potential.

The more practical structure of the electro-optic device, in which the circuit operation described above is performed by the above-mentioned data line 6a, scanning line 3a, and TFT 30, will be described below with reference to FIGS. 9 and 10. In addition, the coating member shown in FIGS. 2 to 6 is not shown in FIG. 10.

The electro-optic device according to the embodiment, as shown in FIG. 10 which is a sectional view at the line A-A' of FIG. 9, can include a transparent TFT array substrate 10 and a transparent opposing substrate 20. The TFT array substrate 10 is made of a quartz substrate, glass substrate, or silicon substrate, for example, and the opposing substrate 20 is made of a glass substrate or quartz substrate, for example.

As shown in FIG. 10, the TFT array substrate 10 is provided with the pixel electrode 9a and the oriented film 16 formed thereon. The pixel electrode 9a comprises a transparent conductive film such as an ITO (indium tin oxide) film. On the other hand, the opposing substrate 20 comprises the opposing electrode 21 formed along the entire surface thereof and the oriented film 22 formed thereunder. Among them, the opposing electrode 21 also comprises a transparent conductive film such as an ITO film as the pixel electrode 9a.

On the other hand, referring to FIG. 9, a plurality of the pixel electrodes 9a are arrayed in a matrix arrangement on the TFT array substrate 10 (the contour being indicated by dotted lines 9a'), and along lengthwise and crosswise boundaries between the pixel electrodes 9a, the data lines 6a and the scanning lines 3a are respectively arranged. The scanning line 3a is arranged so as to oppose a channel region 1a' in a semiconductor layer 1a and shown by an upward sloping shaded region on the plane of the figure, and it serves as a gate electrode. That is, each intersecting position between the scanning line 3a and the data line 6a is provided with the TFT 30 for switching pixels, in which a main line of the scanning line 3a is arranged and opposed to the channel region 1a' as the gate electrode.

The TFT 30, as shown in FIG. 10, has an LDD (lightly doped drain) structure, and it can include the scanning line 3a serving as the gate electrode as mentioned above; the channel region 1a' made of a polysilicon film for example, in which a channel is formed by an electric field from the scanning line 3a, of the semiconductor layer 1a; an insulating film 2 including a gate insulating film for insulating the scanning line 3a from the semiconductor layer 1a; and a lightly doped source region 1b, lightly doped drain region 1c, heavily doped source region 1d, and heavily doped drain region 1e, which are formed on the semiconductor layer 1a.

The TFT 30 may preferably have the LDD structure as shown in FIG. 10, or it may also have an offset structure in which impurities are not implanted in the lightly doped source region 1b and the lightly doped drain region 1c, or the TFT 30 may be a self-aligned TFT in which impurities are implanted in high concentrations using the gate electrode comprising part of the scanning line 3a as a mask so as to form a heavily doped source region and a heavily doped drain region in a self-aligned manner. According to the embodiment, only one gate electrode of the TFT 30 for switching pixels is arranged between the heavily doped source region 1d and the heavily doped drain region 1e; alternatively, two or more gate electrodes may be arranged therebetween. Furthermore, the semiconductor layer 1a constituting the TFT 30 may be a non-monocrystal layer or a monocrystal layer. The monocrystal layer may be structured by a known method such as a bonding method. The monocrystal semiconductor layer 1a may offer technical advantages especially to peripheral circuits.

On the other hand, referring to FIG. 10, the storage capacitance 70 comprises a relay layer 71, connected to the heavily doped drain region 1e and the pixel electrode 9a of the TFT 30, as a capacitance electrode on a pixel potential side; and part of the capacitance line 300 as the capacitance electrode on a fixed potential side, arranged and opposed with a dielectric film 75 therebetween. The storage capacitance 70 enables potential holding characteristics in the pixel electrode 9a to be conspicuously improved.

The relay layer 71, made of a conductive film, functions as the capacitance electrode on a pixel potential side. Alternatively, the relay layer 71 may be made of a single layer film or multi-layered film containing a metal or an alloy in the same way as that of the capacitance line 300 which will be described later. The relay layer 71, in addition to the function as the capacitance electrode on a pixel potential side, has a function of relaying and connecting between the pixel electrode 9a and the heavily doped drain region 1e of the TFT 30 via contact holes 83 and 85. The capacitance line 300 is made of a conductive layer including metal or metal alloy for example and functions as the capacitance electrode on a fixed potential side. The capacitance line 300 viewed planarly, as shown in FIG. 9, is formed by overlapping on a forming region of the scanning line 3a. More specifically, the capacitance line 300 includes a main line extending along the scanning line 3a, projections upward projecting along the data line 6a in the plane of the figure from each of positions intersecting with the data lines 6a, and a contracted section in which a position corresponding to the contact hole 85 contracts slightly. Among them, the projection contributes to increasing the forming region of the storage capacitance 70 using a region above the scanning line 3 and a region under the data line 6a.

Such a capacitance line 300, preferably made of a conductive light-shielding film containing a high-melting metal, has a function of a light-shielding layer for shielding the TFT 30 from incident light above the TFT 30, in addition to the function as the capacitance electrode on a fixed potential side of the storage capacitance 70. Also, the capacitance line 300 may preferably extend from the image display region 10a, on which the pixel electrode 9a is arranged, to the periphery thereof so as to be electrically connected to a constant potential source at a fixed potential. The dielectric film 75, as shown in FIG. 10, is made of an HTO (high temperature oxide) film with a comparatively small thickness of 5 to 200 nm, a silicon oxide film such as an LTO (low temperature oxide) film, or a silicon nitride film. In FIGS. 9 and 10, in addition to the above elements, a lower light-shielding film 11a is arranged under the TFT 30. The lower light-shielding film 11a is patterned in a lattice so as to define an open region of each pixel. In addition, the open region is also defined by the data lines 6a shown in FIG. 9 and the capacitance lines 300 intersecting therewith. The lower light-shielding film 11a, in order to avoid inversely effecting the TFT 30 by changes in potential thereof, in the same way as in the capacitance line 300 mentioned above, may extend from the image display region to the periphery thereof so as to be connected to a constant potential source.

Also, under the TFT 30, an underlying insulation film 12 is provided. The underlying insulation film 12, in addition to a function of interlayer-insulating the TFT 30 from the lower light-shielding film 11a, has a function of preventing characteristics of the TFT 30 for switching pixels from being changed by roughness produced during surface polishing or stains remaining after cleaning, due to formation of the underlying insulation film 12 on the entire surface of the TFT array substrate 10.

Furthermore, on the scanning line 3a, a first interlayer insulation film 41 is formed, on which a contact hole 81 communicated with the heavily doped source region 1d and the contact hole 83 communicated with the heavily doped drain region 1e are formed.

On the first interlayer insulation film 41, the relay layer 71 and the capacitance line 300 are formed, on which a second interlayer insulation film 42 having the contact hole 81 communicated with the heavily doped source region 1d and the contact hole 85 communicated with the relay layer 71 is formed.

According to the embodiment, ions injected into a polysilicon film constituting the semiconductor layer 1a and the scanning line 3a may be activated by baking the first interlayer insulation film 41 at a temperature of about 1000° C. On the other hand, stress produced in the vicinity of the interface of the capacitance line 300 may be relieved by not doing such baking on the second interlayer insulation film 42.

On the second interlayer insulation film 42, the data line 6a is formed, and over which a third interlayer insulation film 43, having the contact hole 85 communicated with the relay layer 71 formed thereon, is formed.

The surface of the third interlayer insulation film 43 is planarized by a CMP (chemical mechanical polishing) treatment so as to reduce orientation defects of the liquid crystal 50 due to steps produced by various kinds of wiring and elements existing thereunder. Alternatively, instead of, or in addition to such planarization of the third interlayer insulation film 43, by forming a groove in at least one of the TFT array substrate 10, the underlying insulation film 12, the first interlayer insulation film 41, and the second interlayer insulation film 42 so that wiring of the data line 6a and the TFT 30, etc. are embedded for the planarization treatment.

The present invention is not limited to the embodiments described above and appropriate modifications can be made within the scope and spirit of the invention, which can be understood from the claims and the entire specification. Electro-optic devices, electronic instruments, and projection displays followed by such modifications are also included within a technical range of the present invention.

Further, while this invention has been described in conjunction with specific embodiments thereof, it is evidence that many alternatives, modifications, and variations will be apparent to those skilled in the art. Accordingly, preferred embodiments of the invention as set forth herein are intended to be illustrative, not limiting. Various changes may be made without departing from the spirit and scope of the invention.

What is claimed is:

1. An electro-optic device, comprising:
a polarizing plate;
a first substrate;
a second substrate opposed to the first substrate;
an electro-optic substance located between the first and second substrates;
a dust-proof plate located on an opposite side of one of the first and second substrates than the electro-optic substance; and
an anti-reflection film disposed at a position between the dust-proof plate and the polarizing plate.

2. The electro-optic device according to claim 1, the anti-reflection film including a plurality of layers.

3. The electro-optic device according to claim 1, further comprising a coating member located to the opposite side of the anti-reflection film than one of the first and second substrates.

4. An electro-optic device, comprising:
a polarizing plate;
a first substrate;
a second substrate opposed to the first substrate;
an electro-optic substance located between the first and second substrates;
a dust-proof plate located on an opposite side of the first substrate than the electro-optic substance; and
an anti-reflection film disposed at a position between the dust-proof plate and the polarizing plate.

5. The electro-optical device according to claim 4, the anti-reflection film including a plurality of layers.

6. The electro-optical device according to claim 4, further comprising a coating member located on the opposite side of the anti-reflection film than one of the first and second substrates.

* * * * *